Nov. 30, 1943. R. S. KOONCE 2,335,518
APPARATUS FOR LOADING AND TRANSPORTING
LARGE SPOOLS OF THREAD AND THE LIKE
Filed May 19, 1939 3 Sheets-Sheet 1
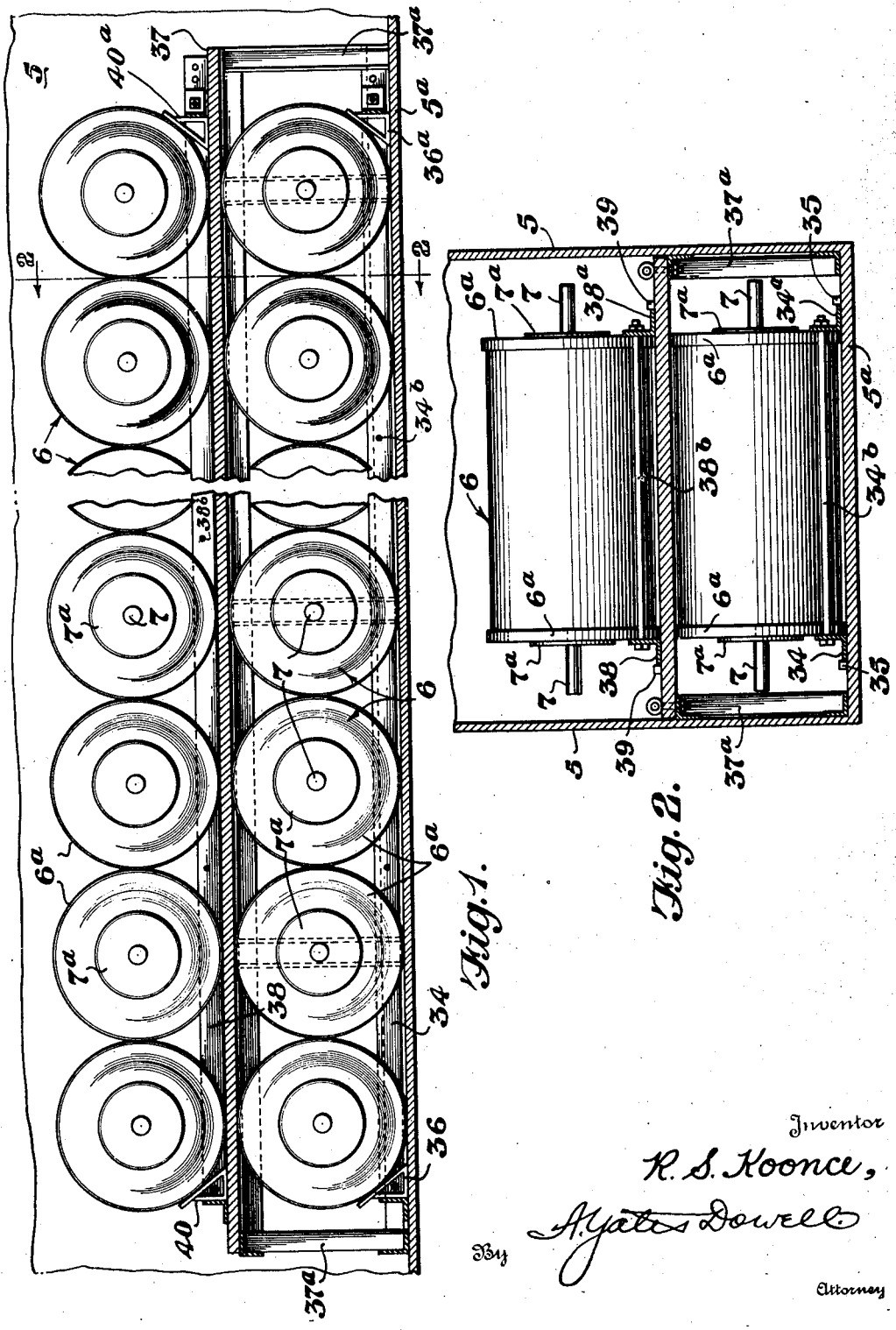

Nov. 30, 1943.    R. S. KOONCE    2,335,518
APPARATUS FOR LOADING AND TRANSPORTING
LARGE SPOOLS OF THREAD AND THE LIKE
Filed May 19, 1939    3 Sheets-Sheet 2
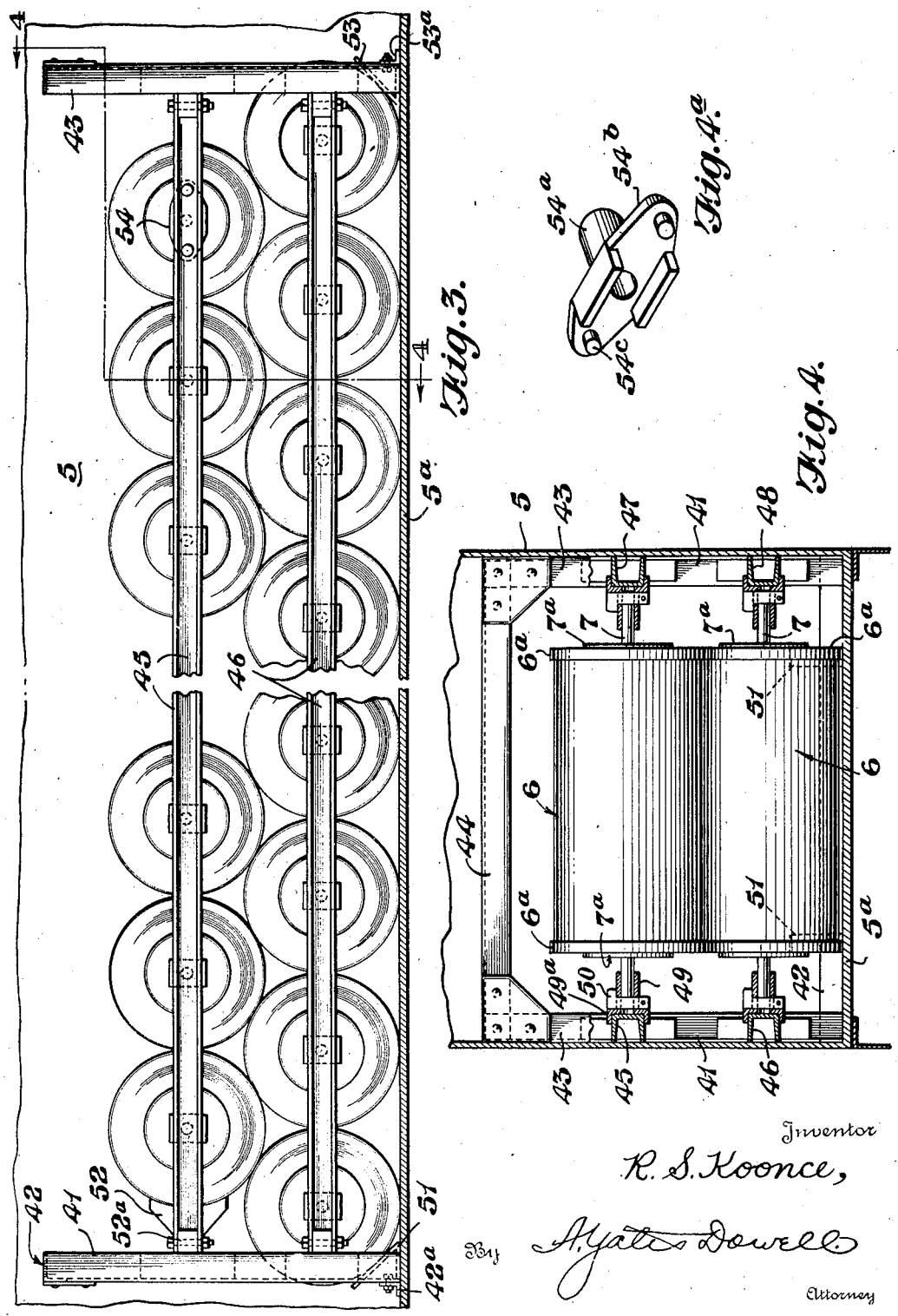

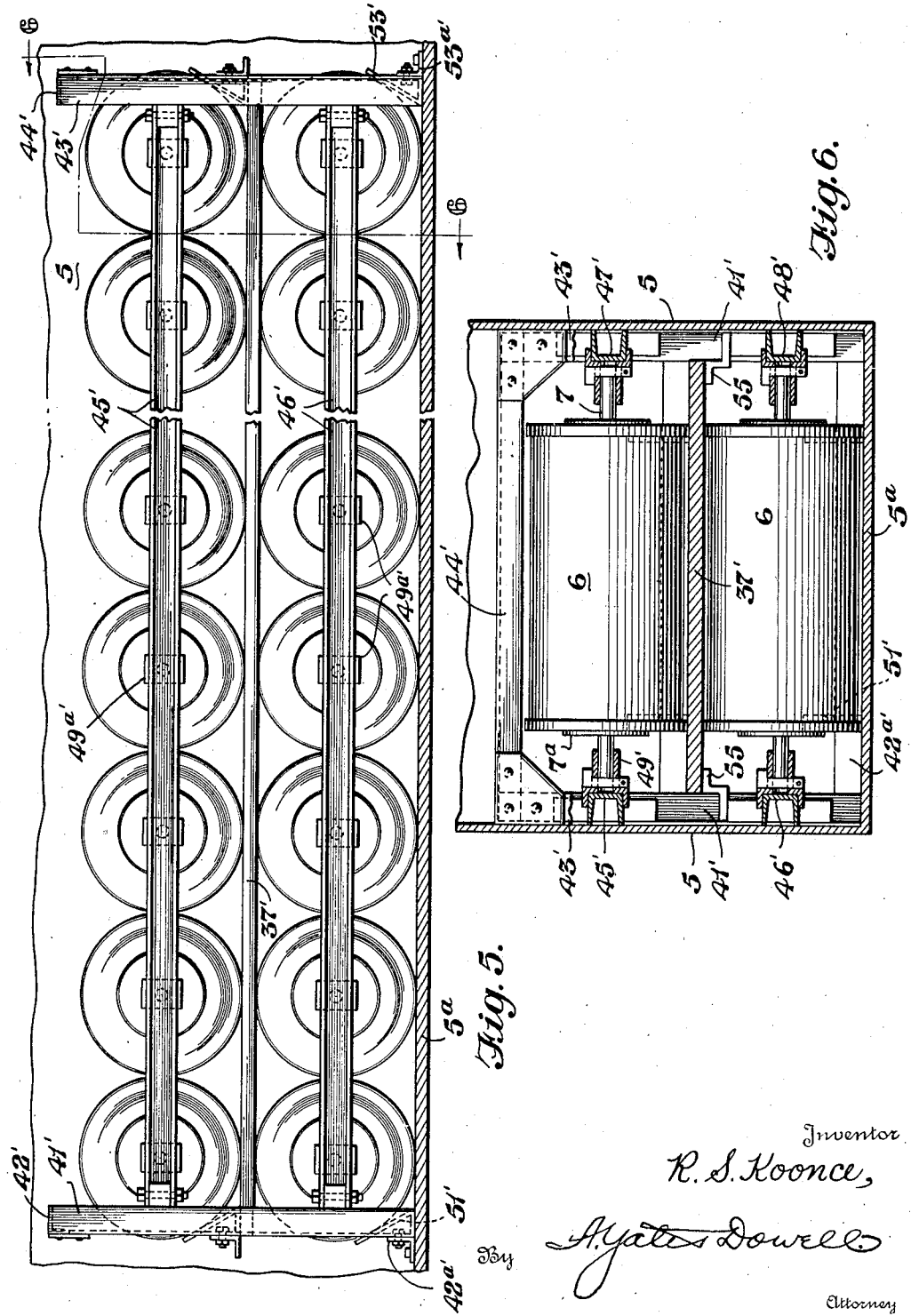

Patented Nov. 30, 1943

2,335,518

UNITED STATES PATENT OFFICE 2,335,518

APPARATUS FOR LOADING AND TRANSPORTING LARGE SPOOLS OF THREAD AND THE LIKE

Richard S. Koonce, Raleigh, N. C., assignor to Atlantic States Motor Lines, Inc., High Point, N. C.

Application May 19, 1939, Serial No. 274,635

3 Claims. (Cl. 214—10.5)

This invention relates to an apparatus for stacking and securing for transportation large spools of thread or cord and similar shaped objects.

The present application embodies subject matter from my copending application, Serial Number 251,235, filed January 16, 1939. Of the figures of the drawings, Figs. 1 to 4 inclusive are identical with Figs. 8 to 11 inclusive of my copending application just specified, while Figs. 5 and 6 illustrate a composite arrangement of Figs. 1 to 4 inclusive.

In my Patent No. 2,144,600, I have disclosed a method and apparatus which has been used successfully in stacking and securing for transportation large spools of rayon tire cord from the rayon manufacturer to the consumer or tire manufacturer, such spools being termed in the art "warp beams" or "beam rolls." These spools or warp beams when loaded with rayon tire cord weigh approximately one thousand pounds each, and if the spools shift during transportation the cord is crushed or bruised necessitating returning of the spool for rewinding.

In the attempt to solve the problem of stacking and securing the spools so as to obtain maximum capacity and yet avoid shifting and resultant damage to the cord, I eventually settled on the method and apparatus disclosed in my patent above noted. However, in experimenting with various types of apparatus, I found that other types could also be used in a practical and satisfactory manner, and the present application is a disclosure of certain of such types.

The primary object of the present invention, therefore, is to provide a method of and apparatus for stacking and securing for transportation relatively large spools and similar shaped objects in a manner such as to avoid shifting and resultant damage to the contents of the spools during transportation. More specifically, the invention is concerned with the stacking and securing for transportation spools or beams having wound thereon cord or thread which is susceptible of bruising and damage when the edge of one spool strikes and rides upon the body portion of another spool.

The foregoing and other objects and advantages of the invention will become apparent in view of the following description taken in conjunction with the drawings, wherein:

Fig. 1 is a view in section and side elevation of spool or beam stacking and securing apparatus embodying the features of the present invention shown disposed on a truck body;

Fig. 2 is a section taken substantially on the line 2—2, Fig. 1;

Fig. 3 is a view similar to Fig. 1 illustrating a modification in structure;

Fig. 4 is a view in sectional elevation taken substantially on the line 4—4, Fig. 3;

Fig. 4a is a detailed perspective view of a spool retaining member for use with the apparatus of Figs. 3 and 4;

Fig. 5 is a view in broken side elevation of a composite arrangement of the apparatus of Figs. 1 to 4 inclusive; and, Fig. 6 is a view in section taken substantially on the line 6—6, Fig. 5.

Referring to the drawings in detail, and first to the type of apparatus shown in Figs. 1 and 2, the vehicle used in transporting the spools in the present instance is a truck or trailer, the body of which is generally indicated at 5 and includes a floor 5a. It will be obvious, however, that the spools and stacking and securing apparatus may be placed on a car body or other transporting apparatus capable of carrying same. The spools or beams are indicated at 6 and are each formed with end flanges 6a which retain the thread or cord on the spools. Spindles 7 project axially through the spools and beyond the opposite ends thereof, said spindles serving as a mounting means during the winding and unwinding of the cord. End plates 7a, preferably of metal, surround the spindles and form a reinforcement at this point.

The spools are loaded on racks or frames devised in a manner such as to facilitate loading, and after loading, serve to retain the spools in a compact non-displaceable unit.

In Figs. 1 and 2, the spools or beams are arranged in superimposed rows, the rows, in effect, being supported independently of one another. The bottom row may be rolled directly onto the floor of the truck or car body between retaining and guide members in the form of angle shapes or irons 34 and 34a which are cross connected by rods 34b, note particularly Fig. 2. These members may be held against shifting movement by studs 35. Chocks 36 and 36a are provided at the rear and front ends of the row to hold or brace the spools against longitudinal rolling movement.

Above the bottom row of spools is a partition or upper floor 37 which is supported by pedestal brackets 37a. On this partition are additional guide and retaining members in the form of angle irons 38, 38a which are connected by cross rods 38b. These guide and retaining members are held against shifting movement by pins or studs 39.

Chocks 40, 40a prevent longitudinal movement of the upper row of spools.

One manner of carrying out the loading operation is to dispose the partition 37 together with its supporting framework in the truck or car body, position the retaining and guide members 34 and 34a on the floor of the body, then roll the lower row of spools in against the rear chocks 36. The front chocks 36a may then be applied and the cross rods 34b tightened. Thereafter the upper row of spools may be rolled into place, chocked and the retaining and guide members 34 and 34a clamped into position against the spool ends.

The partition 37 not only maintains the upper and lower rows of spools separate from one another, positively preventing contact of the superimposed rows and resultant damage from such contact but also facilitates the stacking or loading operation.

Figs. 3, 4 and 4a illustrate a loading and transporting framework arranged to coact with the spindles 7 to hold the spools in stacked and loaded position. The frame or rack structure comprises a rear end supporting frame made up of side uprights 41 which are connected by cross members 42, 42a; and front uprights 43 connected by a cross beam 44. The end uprights are connected by longitudinal channel beams 45, 46, 47 and 48. These side channels have slidingly mounted thereon a series of spindle gripping units, the construction of which is best illustrated in Fig. 4, each unit comprising a sleeve 49 adapted to engage over one end of the spindle 7 and having a bracket portion 49a adapted to slidingly engage one of the longitudinally extending channel members. The sleeve 49 is slotted to receive locking key 50 which when applied abuts the end of the spindle and holds the sleeve extended with the bracket 49a in relatively close engagement with its coacting side channel.

The rear end of the framework is provided with chocks 51, supported by cross member 42a, for chocking the lower row of spools, and upper chocks are mounted on a cross member 52a for chocking the rear end of the upper row of spools, these latter chocks being of a contour such as to grip the coacting spools instead of simply chocking the latter. The front end of the framework is provided with chocks 53 mounted on a removable cross member 53a for chocking the lower row of spools at this end; while the cross members 46 and 47 are each provided with a combined spindle-gripping and spool-holding member generally indicated at 54 and shown in detail in Fig. 4a. This member comprises a sleeve 54a adapted to engage over the spindle of a coacting spool and a bracket portion 54b adapted to slide on the adjacent side channel member and provided with studs 54c which engage in holes formed in said side channel member. The sleeve 54a is slotted to receive a key in a manner similar to sleeve 49. The manner in which this device operates will be clearly understood by referring to Figs. 3 and 4. When the rear spool is applied, the member 54 is inserted on the end of the spindle and slid along its coacting channel member until the studs 54c register with the holes formed in said channel member, whereupon one of the keys 50 may be inserted to lock the device in position.

The rack or framework as shown in Figs. 3 and 4 is of the knock-down type. When the truck or car body is to be loaded, the front and rear frame members may be placed in position, the side channels then applied; thereafter the sleeves 49 are inserted on the spindles 7 of the spools as the latter are rolled into position, the brackets 49a riding on their coacting side channels until the proper position is reached, whereupon the keys 50 are driven in to lock the sleeves in place. The upper row may be applied after or during the time the bottom row is placed in position and the sleeves 49 applied in a like manner. When the rows have been chocked, including the positioning or application of the members 54, the result is that the spools are tied together as a non-displaceable unit.

In connection with the member 54, it will be obvious that instead of applying this solely to the rear spool of the upper row, it may be used on end spools of both rows or in fact may be used with all the spools.

It will be noted that the side beams 45, 46, 47 and 48 rigidly connect the projecting spindles of the spools of each row and thereby hold the spools together as a unit in rows; while the end supports 41 and 43 to which the side beams are connected receive the load and transfer the weight directly to the floor of the truck body. Thus, the spools are in effect rigidly connected together and braced both against longitudinal rolling and lateral shifting movement. The supporting framework, including the side beams and end supports, are preferably spaced so that they snugly engage the sides of the truck body in order to prevent shifting of the entire framework and spools within the body.

As heretofore stated, the stacking and securing apparatus of Figs. 5 and 6 is a composite arrangement of the apparatus shown in Figs. 1 to 4 inclusive. Since the parts utilized in this composite arrangement are identical with parts serving an analogous function in the preceding figures, like reference numerals have been used for corresponding parts with the exception that a prime has been added. Thus, the side uprights of the rear end supporting frame are indicated at 41', their cross connecting members at 42', 32a'; the front uprights at 43' and their cross connecting members at 44'; the longitudinal side channel beams at 45', 46', 47' and 48', etc. The principal difference between the structure illustrated in Figs. 5 and 6 and that shown in Figs. 3 and 4 is that the partition or upper floor of Figs. 1 and 2 has been interposed between the respective lower and upper rows of spools, the said partition or upper floor being indicated in Figs. 5 and 6 at 37'. To facilitate mounting of the partition or upper floor and also to relieve the weight of the upper row of spools from the lower row, guide and supporting brackets 55 may be secured to the uprights 41', 43' to receive the opposite edges of said partition or upper floor, note Fig. 6. This construction transfers the weight of the upper row of spools, at least in part, to the floor 5a of the truck body 5 through said uprights.

This composite structure has an advantage over that shown in Figs. 3 and 4 in that the loading and stacking operation is facilitated, the spools being rolled to their aligned position in rows, first on the floor of the truck body and then on the upper floor 37'. Also, the partition or upper floor positively separates the respective rows of spools so that there is no chance of contact as a result of superimposition of one roll upon the other. In loading the spools, the lower row may first be rolled into position, the sleeves 49' applied to lock the row to the side beams or channels and the chocks 53' then placed in position to prevent longitudinal rolling movement of the lower row. The upper floor or partition 37' may then be placed on the lower row of spools and the upper row rolled into position on said partition, chocked and locked into aligned position in a manner similar to the lower roll.

It will be seen that the spools when stacked and secured by the type of apparatus shown in Figs. 5 and 6 have their spindles connected in a manner such that the spools cannot roll and contact one another, the connecting means in turn being anchored or secured to the floor of the truck body, holding the superimposed rows of spools together as a unit with the body.

A feature in common with all the types of stacking and securing apparatus disclosed herein is that the lower and upper rows of spools are to a considerable extent supported independently of one another, the weight being transferred directly to the floor of the truck body. While in Figs. 3 and 4, the edges of the spools of the respective rows are shown in contact, yet here the side frame members or beams 45 and 46 support the weight of the respective rows of spools, at least in part, and transfer the weight through the end uprights 42 and 43 to the floor of the truck body.

In all the forms shown, the cardinal principle followed in devising the framework or rack structure has been to provide means for preventing the spools from shifting and becoming misaligned due to vibration, jarring and in some instances upsetting of the truck or car in which the load is carried. The term "spools" as used herein is meant to include not only warp beams but also reels and other objects having in general a spool shape or when filled a generally cylindrical contour adapted to carry material susceptible of damage through shifting or misalignment of the spools.

It will be understood that certain changes in construction and design may be adopted within the scope and spirit of the invention as defined by the appended claims.

What is claimed is:

1. Apparatus for stacking and securing for transportation on a car or truck body strand material such as rayon tire cord and the like and which material is wound on heavy flanged spools or warp beams arranged in lower and upper rows and having axial spindles projecting from opposite ends thereof, longitudinally extending side members adjacent opposite ends of the spools, frame members releasably connecting each of said spindles to said side members, and means supporting said side members from the truck or car body.

2. Apparatus for stacking and securing for transportation on a car or truck body strand material such as rayon tire cord and the like and which material is wound on heavy flanged spools or warp beams arranged in lower and upper rows and having axial spindles projecting from opposite ends thereof, comprising a supporting frame work including end uprights, longitudinally extending side members connected to and supported by said end uprights, a series of bracket members one for each end of each spindle, each of said bracket members being adapted to engage a coacting spindle, and means locking each bracket member to an adjacent side member when the spindle of the spool to which the bracket member has been applied has been positioned at the desired point with respect to the frame.

3. Apparatus for stacking and securing for transportation on a car or truck body strand material such as rayon tire cord and the like and which material is wound on heavy flanged spools or warp beams arranged in lower and upper superimposed rows and having axial spindles projecting beyond opposite ends of each spool comprising supporting framework including end uprights at opposite ends of the rows of spools, longitudinally extending side members connected to and supported by said end uprights, a series of brackets tying the spindles to said side members each including means adapted to engage the ends of a spindle and means coacting therewith and adapted to engage an adjacent side member, and means chocking the rows of spools against longitudinal rolling movement.

RICHARD S. KOONCE.